W. R. ORMANDY.
PROCESS OF REFRIGERATION.
APPLICATION FILED APR. 13, 1917.

1,331,356.

Patented Feb. 17, 1920.

INVENTOR
WILLIAM R. ORMANDY
BY
ATTORNEYS

UNITED STATES PATENT OFFICE.

WILLIAM REGINALD ORMANDY, OF LONDON, ENGLAND, ASSIGNOR TO SEAY SYNDICATE LIMITED, OF MANCHESTER, ENGLAND.

PROCESS OF REFRIGERATION.

1,331,356.  Specification of Letters Patent.  Patented Feb. 17, 1920.

Application filed April 13, 1917. Serial No. 161,856.

*To all whom it may concern:*

Be it known that I, WILLIAM REGINALD ORMANDY, D. Sc., a subject of the King of Great Britain and Ireland, residing at Imperial House, Kingsway, London, W. C., England, have invented certain new and useful Improvements in the Processes of Refrigeration, of which the following is a specification.

This invention relates to improvements in connection with the process employed when producing low temperatures and the making of ice, in which ammonia gas is constantly brought into contact with a solid absorbent contained in a vessel during the period of absorption and liquefaction of the absorbent, which ammonia is subsequently again vaporized and put under pressure for condensation by the application of heat.

The object of the present invention is to simplify the methods of operation hitherto employed in connection with the above process when making use of the absorption of ammonia by ammonium nitrate and to enable a solid or semi-solid to be operated upon, so that the material may be utilized in a dry form during the whole cycle of operations, thereby obviating the necessity for the alternate production of liquid, such as under some circumstances is liable to cause mechanical difficulties associated with its production.

According to the invention, both the absorbent and the product yielded by the absorption are associated with or absorbed in a solid material and form therewith a solid product from which either no liquid or no substantial quantity of liquid separates.

The solid material employed according to the invention is preferably an inorganic body, and as suitable inorganic bodies kieselguhr, pumice or other porous natural or artificial material, for instance, a clay-like absorbent material, may be employed.

The invention comprises also the process in which this solid product is contained in generator absorbers admitting of a rapid transfer of heat to and abstraction of heat from the solid material.

Within these generator absorbers the solid product is advantageously disposed in, for instance, thin layers on stationary supports, which supports may themselves act as heating and cooling means.

These supports have preferably surfaces of a character adapted rapidly to abstract heat from or transmit heat to the solid product. Such surfaces may be corrugated or provided with projections extending into the body of solid material.

The invention also consists in the process substantially as hereinafter described.

The invention is based upon the results of experiments carried out in connection with the process for the production of a refrigerating effect and in the production of ice by the employment, as refrigerant, of an absorbent such as ammonium nitrate. I have found, for instance, that it is possible to keep the material in a dry form, that is to say, to maintain a solid product from which the absorbent and the product yield by the absorption in the form of either no liquid or no substantial amount of liquid separates during the whole cycle of operations, by mixing the liquid compound of ammonium nitrate and ammonia with sufficient suitable absorptive material to convert the liquor into the form of powder. As an example, I have found that if 100 parts of ammonium nitrate are taken which will absorb about 35 parts of ammonia at 12° C. to form a liquid, and 2 parts of this liquid are mixed with 1 part of ignited kieselguhr (infusorial earth), I convert the mixture into a dry product which will give out and absorb ammonia under the alternations of temperature just as will the original ammonium nitrate.

Instead of employing infusorial earth, it is obvious that other absorbent bodies can be used, but from motives of safety it may be advisable not to use organic absorbents.

The dry powder made with infusorial earth or other inorganic absorbent being a poor conductor of heat, I spread the product on a shelf-like apparatus, or a series of carriers arranged in any suitable vessel which may be alternately heated and cooled, or the shelf may be disposed in the form of plain carrying benches or tables which can be conveniently heated and cooled by an arrangement of steam and water pipes provided in connection therewith.

I make the layers of material to be as thin as possible, and give the greatest surface to the shelf or supporting element by providing ridges, corrugations or projections thereon, such as would serve to transfer the heat occasioned by the reactions.

While it is possible to operate upon considerable thicknesses of the dry powder, the time of absorption will be more or less dependent on the thickness of the layer, and it is therefore desirable that the thickness or extent of the layer should be determined for securing the greatest economy having regard to the size of plant and apparatus that is to be employed, together with the time necessary to obtain adequate saturation.

Instead of employing infusorial earth, porous bodies, such as pumice-stone or the like or other artificial blocks or slabs of clay-like absorbent material may be used for the purposes of effecting the conversion of the liquid into the dry form, that is to say, into the form of a solid product from which no substantial amount of liquid separates.

The accompanying drawings illustrate, by way of example a form of generator absorber which may be employed in carrying the invention into effect.

Figure 1:
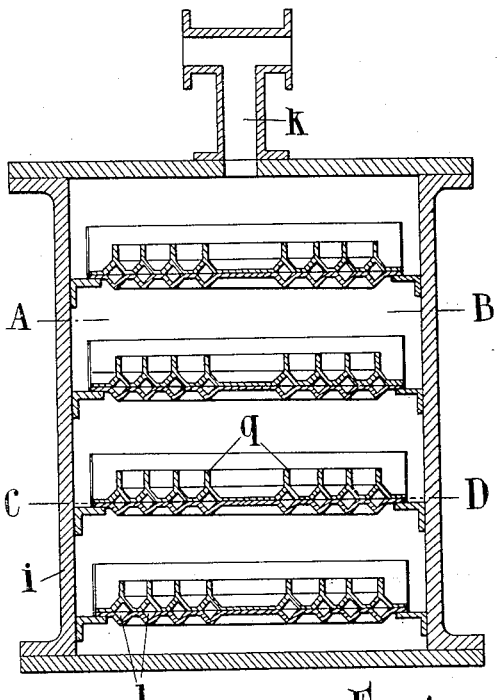
Figure 1 is a sectional elevation of the generator absorber.
Figure 4:
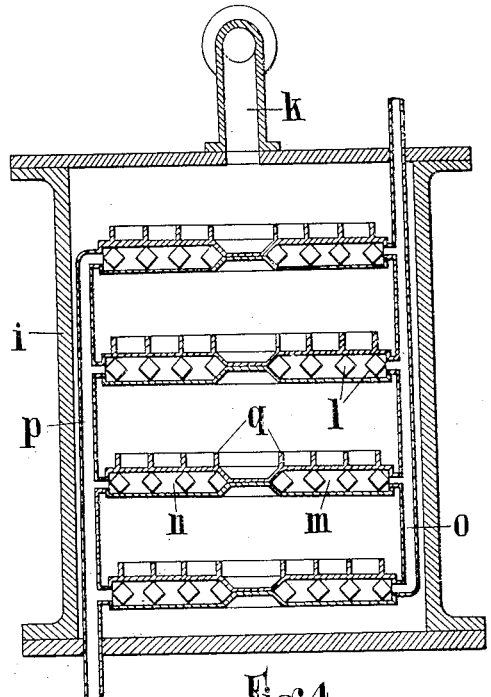
Fig. 4 is a section on the line E—F of Fig. 3.
Figure 2:
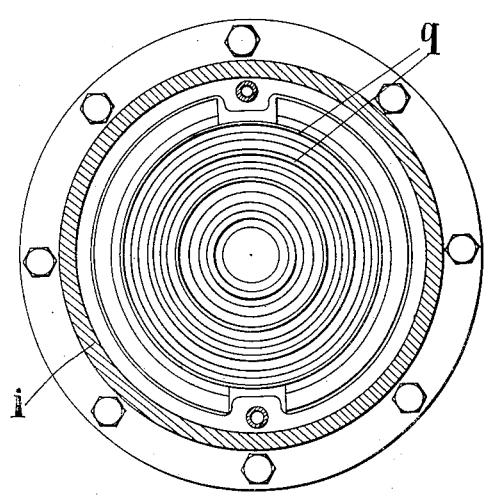
Figs. 2 and 3 are sectional plans respectively taken at A—B and C—D of Fig. 1.
Figure 3:
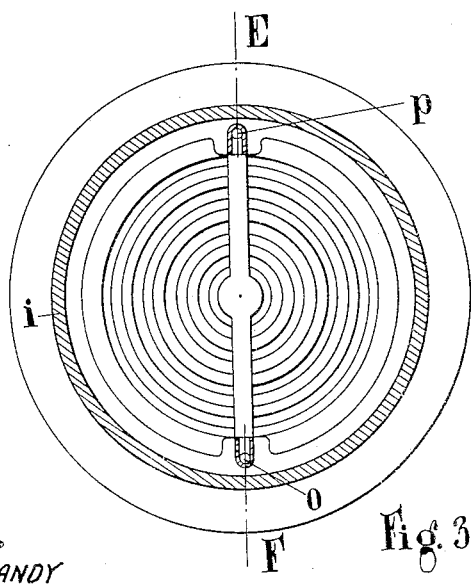

The apparatus illustrated comprises a common chamber $i$ fitted with a vapor inlet and outlet $k$ a series of superposed elements supported therein in any suitable manner, each element consisting of a number of tubes or passages $l$ communicating by common ducts $m$ $n$ with the inlet and outlet pipes $o$ $p$ for the steam and water or other heating and cooling media, and surmounted by ribs, fins or projections $q$. In this case the pipes or conduits $l$ themselves serve to form the corrugations or the like that divide up the absorbent material. Upon these elements $k$ the solid material associated with the absorbent or the product resulting from the absorption are supported being cooled or heated as the case may be to effect the absorption or expulsion of the gaseous material employed as refrigerant.

I do not limit the application of my invention to any particular porous material, but I employ any suitable body, capable of absorbing the ammonium nitrate-ammonia liquid, and I utilize any ordinary form of apparatus capable of being alternately heated and cooled for the purpose of carrying my powder or porous material and for securing refrigerative effects therefrom, modifying the apparatus and the method of employing my improved process to suit the size and type of plant that is to be installed for use therewith.

Having now described my invention what I claim as new and desire to secure by Letters Patent is:—

1. The process for the production of a refrigerating effect involving the absorption of a gaseous material employed as refrigerant by an absorbent such as ammonium nitrate, which comprises bringing together the gaseous material and a solid inorganic body impregnated with the absorbent while abstracting heat, heating the solid inorganic body impregnated with the absorbent and the absorbed gaseous material to effect expulsion of the gaseous material, cooling the gaseous material to effect liquefaction thereof, evaporating the liquefied product to produce a refrigerating effect and re-absorbing the gaseous material by bringing it into contact with a solid inorganic body impregnated with an absorbent while abstracting heat from the same.

2. The process for the production of a refrigerating effect involving the absorption of a gaseous material employed as refrigerant by an absorbent such as ammonium nitrate, which comprises bringing together the gaseous material and a porous silicious material impregnated with the absorbent while abstracting heat, heating the porous silicious material impregnated with the absorbent and the absorbed gaseous material to effect expulsion of the gaseous material, cooling the gaseous material to effect liquefaction thereof, evaporating the liquefied product to produce a refrigerating effect and re-absorbing the gaseous material by bringing it into contact with a porous silicious material impregnated with an absorbent while abstracting heat from the same.

3. The process for the production of a refrigerating effect involving the absorption of a gaseous material employed as refrigerant by an absorbent such as ammonium nitrate, which comprises bringing together the gaseous material and kieselguhr impregnated with the absorbent while abstracting heat, heating the kieselguhr impregnated with the absorbent and the absorbed gaseous material to effect expulsion of the gaseous material, cooling the gaseous material to effect liquefaction thereof, evaporating the liquefied product to produce a refrigerating effect and re-absorbing the gaseous material by bringing it into contact with kieselguhr impregnated with an absorbent while abstracting heat from the same.

4. A process for the production of a refrigerating effect which comprises bringing the gaseous material to be employed as refrigerant into contact with a stationary and comparatively thin layer of a solid inorganic body impregnated with an absorbent while abstracting heat therefrom, then heating the solid inorganic body impregnated with the absorbent and the absorbed gaseous material to effect expulsion of the gaseous material, cooling the gaseous material to effect liquefaction thereof, evaporating the liquefied product to produce a refrigerating effect and re-absorbing the gaseous material by bringing it into contact with a solid inorganic body impregnated with an absorbent while abstracting heat from the same.

5. The process for the production of a refrigerating effect which comprises bringing the gaseous material to be employed as refrigerant into contact with a stationary and comparatively thin layer of a porous silicious material impregnated with an absorbent while abstracting heat therefrom, then heating the porous silicious material impregnated with the absorbent and the absorbed gaseous material to effect expulsion of the gaseous material, cooling the gaseous material to effect liquefaction thereof, evaporating the liquefied product to produce a refrigerating effect and re-absorbing the gaseous material by bringing it into contact with a porous silicious material impregnated with an absorbent while abstracting heat from the same.

6. The process for the production of a refrigerating effect which comprises bringing the gaseous material to be employed as refrigerant into contact with a stationary and comparatively thin layer of kieselguhr impregnated with an absorbent while abstracting heat therefrom, then heating the kieselguhr impregnated with the absorbent and the absorbed gaseous material to effect expulsion of the gaseous material, cooling the gaseous material to effect liquefaction thereof, evaporating the liquefied product to produce a refrigerating effect and re-absorbing the gaseous material by bringing it into contact with kieselguhr impregnated with an absorbent while abstracting heat from the same.

7. The process for the production of a refrigerating effect which comprises bringing the gaseous ammonia to be employed as refrigerant into contact with a stationary and comparatively thin layer of a solid inorganic body impregnated with an absorbent while abstracting heat therefrom, then heating the solid inorganic body impregnated with the absorbent and the absorbed gaseous ammonia to effect expulsion of the gaseous ammonia, cooling the gaseous ammonia to effect liquefaction thereof, evaporating the liquefied product to produce a refrigerating effect and re-absorbing the gaseous ammonia by bringing it into contact with a solid inorganic body impregnated with an absorbent while abstracting heat from the same.

8. The process for the production of a refrigerating effect which comprises bringing the gaseous ammonia to be employed as refrigerant into contact with a stationary and comparatively thin layer of a porous silicious material impregnated with an absorbent while abstracting heat therefrom, then heating the porous silicious material impregnated with the absorbent and the absorbed gaseous ammonia to effect expulsion of the gaseous ammonia, cooling the gaseous ammonia to effect liquefaction thereof, evaporating the liquefied product to produce a refrigerating effect and re-absorbing the gaseous ammonia by bringing it into contact with a porous silicious material impregnated with an absorbent while abstracting heat from the same.

9. The process for the production of a refrigerating effect which comprises bringing the gaseous ammonia to be employed as refrigerant into contact with a stationary and comparatively thin layer of kieselguhr impregnated with an absorbent while abstracting heat therefrom, then heating the kieselguhr impregnated with the absorbent and the absorbed gaseous ammonia to effect expulsion of the gaseous ammonia, cooling the gaseous ammonia to effect liquefaction thereof, evaporating the liquefied product to produce a refrigerating effect and re-absorbing the gaseous ammonia by bringing it into contact with kieselguhr impregnated with an absorbent while abstracting heat from the same.

10. The process for the production of a refrigerating effect which comprises bringing the gaseous ammonia to be employed as refrigerant into contact with a stationary and comparatively thin layer of a solid inorganic body impregnated with ammonium nitrate while abstracting heat therefrom, then heating the solid inorganic body impregnated with the ammonium nitrate and the absorbed gaseous ammonia to effect expulsion of the gaseous ammonia, cooling the gaseous ammonia to effect liquefaction thereof, evaporating the liquefied product to produce a refrigerating effect and re-absorbing the gaseous ammonia by bringing it into contact with a solid inorganic body impregnated with ammonium nitrate while abstracting heat from the same.

11. The process for the production of a refrigerating effect which comprises bringing the gaseous ammonia to be employed as refrigerant into contact with a stationary and comparatively thin layer of a porous silicious material impregnated with ammonium nitrate while abstracting heat therefrom, then heating the porous silicious material impregnated with the ammonium nitrate and the absorbed gaseous ammonia to effect expulsion of the gaseous ammonia, cooling the gaseous ammonia to effect liquefaction thereof, evaporating the liquefied product to produce a refrigerating effect and re-absorbing the gaseous ammonia by bringing it into contact with a porous silicious material impregnated with ammonium nitrate while abstracting heat from the same.

12. The process for the production of a refrigerating effect which comprises bringing the gaseous ammonia to be employed as refrigerant into contact with a stationary and comparatively thin layer of kieselguhr impregnated with ammonium nitrate while abstracting heat therefrom, then heating the kieselguhr impregnated with the ammonium nitrate and the absorbed gaseous ammonia to effect expulsion of the gaseous ammonia, cooling the gaseous ammonia to effect liquefaction thereof, evaporating the liquefied product to produce a refrigerating effect and re-absorbing the gaseous ammonia by bringing it into contact with kieselguhr impregnated with ammonium nitrate while abstracting heat from the same.

In testimony whereof I have signed my name to this specification.

WILLIAM REGINALD ORMANDY.